United States Patent
Jacobs

[15] 3,699,701
[45] Oct. 24, 1972

[54] FISH HOOK SETTERS

[72] Inventor: Louis L. Jacobs, 1720 Pearl Street, Denver, Colo. 80203

[22] Filed: Aug. 2, 1971

[21] Appl. No.: 167,960

[52] U.S. Cl. ..................................43/15, 43/21.2
[51] Int. Cl. ...................................A01k 97/00
[58] Field of Search..........................43/15, 16, 21.2

[56] References Cited

UNITED STATES PATENTS

| | | | |
|---|---|---|---|
| 1,957,853 | 5/1934 | Sibley | 43/15 |
| 2,661,563 | 12/1953 | Adams, Jr. et al. | 43/16 |
| 2,744,351 | 5/1956 | Smith | 43/16 |
| 2,770,906 | 11/1956 | Hood | 43/16 |
| 2,835,065 | 5/1958 | Schwartzkopf | 43/15 |
| 2,964,868 | 12/1960 | Bennett | 43/15 |

Primary Examiner—Louis G. Mancene
Assistant Examiner—Daniel L. Leach
Attorney—Enloe Wilkinson

[57] ABSTRACT

A fish hook setter comprising a support and a pole holder pivotally mounted thereon with a tension spring secured to the rear end of the pole holder and to a bracket on the support. A trigger having a line holder thereon is pivotally secured to the support forwardly of the pole holder and is held in operative position by a lever which slidably engages the pole holder. When the trigger is pivoted by a pull on the line, it is disengaged from the lever and the spring jerks the pole holder with the fishing rod therein sharply upwardly to set the hook in the fish's mouth.

9 Claims, 7 Drawing Figures

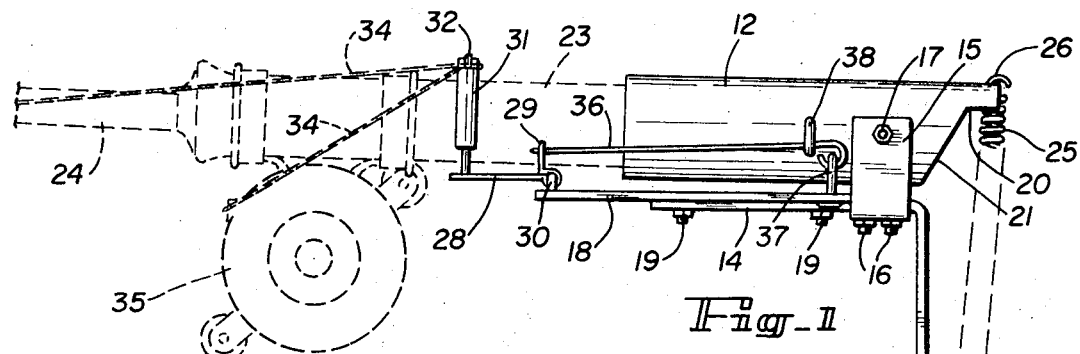
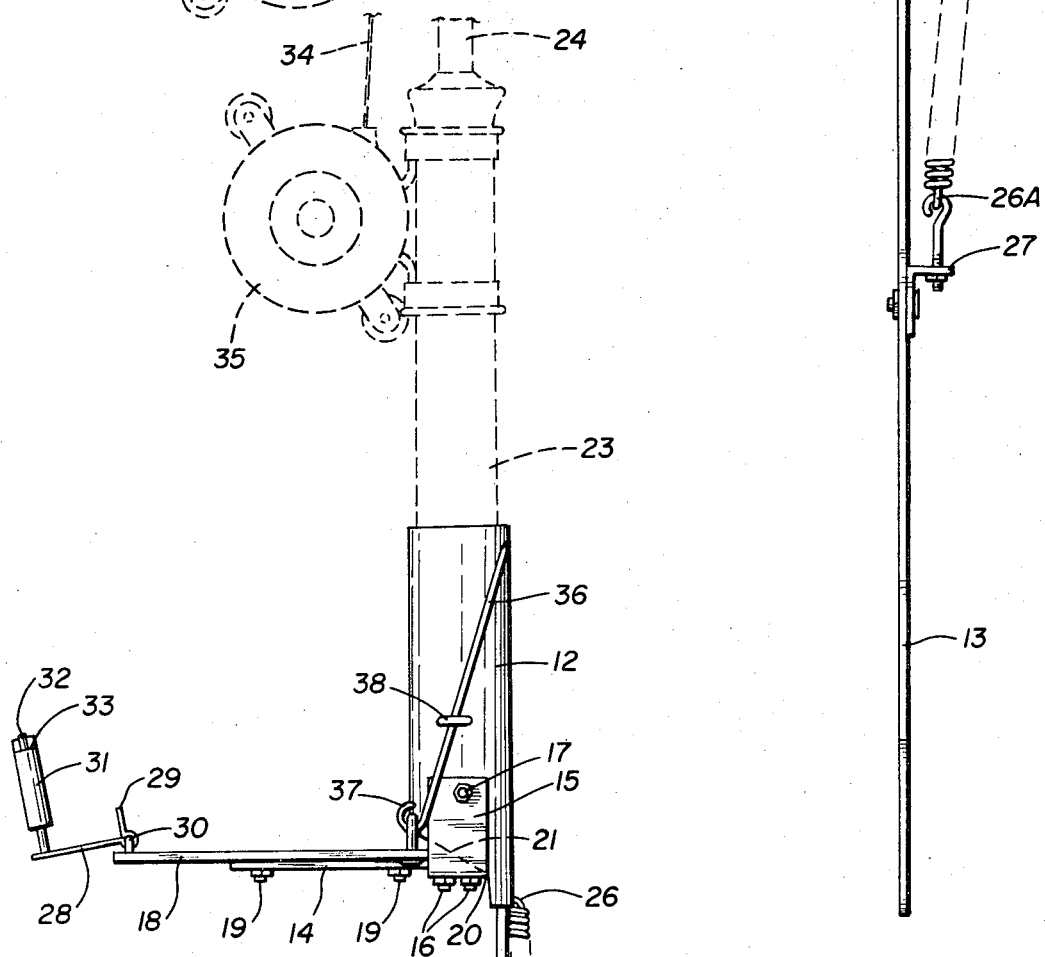
INVENTOR.
LOUIS L. JACOBS
BY
Enloe Wilkinson
ATTORNEY

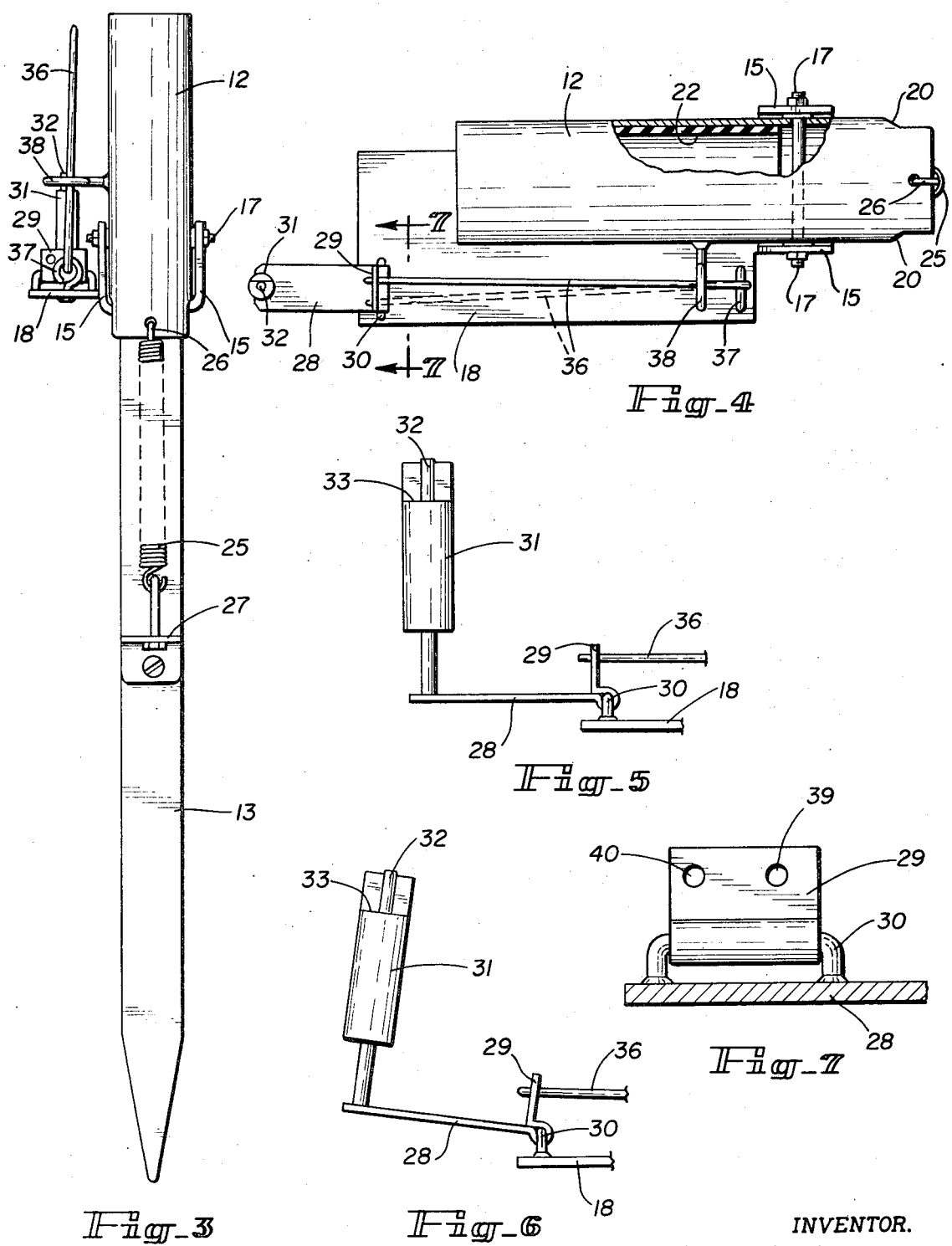

FISH HOOK SETTERS

The present invention relates to fishing gear and more particularly to a device for setting the hook in the mouth of a fish which has grasped at the hook sufficiently to have disturbed the hook and line.

Frequently a fish will bite at a baited hook or lure and make off before the fisherman jerks his line and sets the hook in the mouth of the fish. At other times a fisherman may not be aware that a fish is biting at his hook and will fail to jerk his line and set the hook.

It is therefore, an object of the present invention to provide a device which will jerk a fishing line and hook at such times as it may be disturbed by a fish.

Another object is to provide a fish hook setting device which may be set to jerk a fishing line when it is disturbed to a greater or lesser extent.

It is a further object to provide a fish hook setting device which may be left unattended and which will set the fish hook in the mouth of a fish without the aid of an operator.

Still another object of the present invention is to provide a fish hook setting device which is simple and efficient in operation and which is economical to manufacture.

With these and various other objects in view the invention may consist of certain novel features as will be more fully described and particularly pointed out in the specification, drawings and claims appended hereto.

In the drawings:

FIG. 1 is a side elevation of a fish hook setter with the device in operative position with a fishing pole in position on the device having a reel and line shown in broken lines.

FIG. 2 is a side elevation of the device in inoperative position after the hook-setting action has taken place.

FIG. 3 is a rear view of the device in inoperative position.

FIG. 4 is a top plan view of the device in operative position, partly in section and showing the lever in an alternate position with respect to the trigger being shown in broken lines.

FIG. 5 is an enlarged side view of the trigger arm and line holder with the lever set in one of the trigger openings.

FIG. 6 is an enlarged side view of the trigger arm and line holder such as shown in FIG. 5 with the lever set in an alternate opening in the trigger.

FIG. 7 is an enlarged rear view of the trigger showing the openings for setting the lever.

Referring to the drawings more particularly, a pole holder is indicated at 12. A mounting bracket consists of a vertical portion 13 which has a pointed lower end such as a stake and a laterally extending arm 14. The pointed end of the vertical portion may be driven into the ground to hold the vertical portion in an upright position. It is obvious that the vertical portion could be provided with various means for securing it to a boat or dock for holding it in an upright position. The laterally extending arm 14 extends outwardly from the upper end of the vertical portion 13 of the mounting bracket and may be integrally formed with or suitably attached to the vertical portion 13.

A U-shaped member 15 having oppositely disposed upstanding arms is mounted on the laterally extending arm 14 of the mounting bracket; it may be secured by bolts 16, welded or otherwise connected to the lateral arm 14. The inner end portion of the pole holder 12 is positioned between arms of the U-shaped member 15 and is pivotally mounted there by means of a bolt or pin 17 which passes through the arms and the pole holder.

A laterally extending plate 18 is secured to the arm 14 by bolts 19; this plate may also be welded to the arm 14 or integrally formed with it.

The inner end of the pole holder 12 has an offset portion 20 which engages the upright vertical portion 13 of the mounting bracket when the pole holder 12 is in inoperative position, as shown in FIGS. 2 and 3. This prevents the pole holder from moving rearwardly past a substantially vertical position. Adjacent the offset portion 20 the inner end of the pole holder 12 is cut away at 21 so that it will not interfere with the mounting bracket or the U-shaped member 15 as it moves from a horizontal operative position to a vertical inoperative position.

The pole holder 12 is tubular in shape and has a lining 22 as shown in FIG. 4; this may be of rubber or similar material which will frictionally hold the handle 23 of a fishing pole 24 securely within the pole holder 12.

A tension spring 25 is attached at its upper end 26 to the inner end of the pole holder 12; the lower end 26A is attached to the vertical portion of the mounting bracket 13 in any suitable manner such as by hooking it to a bracket 27 secured to the vertical portion of the mounting bracket 13. The spring 25 holds the pole holder 12 in an upright position under tension as shown in FIGS. 2 and 3 with the offset portion 20 abutting the vertical portion 13 of the mounting bracket which prevents the pole holder 12 from moving rearwardly past an upright inoperative position.

A trigger arm 28 is pivotally mounted adjacent the outer end of the plate 18 on a horizontal pin 30 which is secured to the plate 18. The outer end of the trigger arm 28 has a line holder 31 secured to it. In the embodiment shown, it consists of a vertical pin 32 mounted on the outer portion of the trigger arm 28. The line holder may be made of nylon, plastic or other material which is capable of frictionally holding a fishing line.

A fishing line, indicated at 34 in FIGS. 1 and 2, passes between the pin 32 and the holder 31 adjacent the offset portion 33 of the line holder and is frictionally held between them. The inner end of the line 34 is wound on a reel 35; however a reel is not essential to the operation of the device. The line 34 after leaving the reel 35 passes through the line holder and is frictionally held there; the outer part of the line extends along the pole 24 and has a hook attached to its outer end which is not shown. The reel is locked thereby preventing the line from unreeling at any time.

A lever 36 is pivotally connected at 37 to the plate 18 adjacent its inner end. Reference to the plate 18 is considered as being a part of the laterally extending arm 14 of the mounting bracket. The lever 36 extends through a guide such as the eye 38 secured to the pole holder 12. The trigger 29 extends upwardly from the inner end of the trigger arm 28 and has one or more openings 39 and 40 through which the outer portion of the lever may extend when the pole holder 12 is moved to a substantially horizontal position. One of the openings 39 is substantially in alignment with the lever 36 and other openings such as 40 may be positioned on either or both sides of the opening 39. It is apparent that the outer portion of the lever 36 will extend through the opening 39 to a greater extent than through the opening 40 since it is in alignment with the opening 39. When the lever 36 is inserted in the opening 40, less of it extends through the opening since it is at an angle to the opening rather than in alignment with it; this makes the trigger more sensitive to any tension on the line caused by a fish disturbing the hook.

In operation, the handle 23 of a fishing pole 24 is inserted in the pole holder 12 and is frictionally secured there by the resilient lining 22. The pole 24 and holder 12 are then moved to a substantially horizontal position as shown in FIGS. 1 and 4. The lever 36 is moved downwardly and its outer end inserted in one of the openings 39 or 40. The lever 36 passing through the eye 38 holds the pole holder 12 in a substantially horizontal position when its outer end is inserted in one of the openings in the trigger 29.

The fishing line 34 is inserted between the pin 32 and the line holder 31 adjacent the offset portion 33 and is frictionally held there. The amount of fishing line which extends outwardly along the pole 24 with a fish hook or lure attached to its outer end is left to the judgment of the fisherman. Also as to whether the outer end of the lever 36 is inserted in the opening 39 of the trigger which is in alignment with the lever 36 or the alternate opening 40 depends upon the size of fish anticipated as well as the condition of the water and the amount of wind. These conditions must be taken into consideration, since it is the disturbance of the line which activates the device.

If the outer end of the lever 36 were inserted in the opening 40 of the trigger 29 it would necessarily be at an angle from its pivotal connection 37 and the outer end of the lever would not extend through the opening 40 to the extent it would if inserted in the opening 39 thereby making the trigger more sensitive to any disturbance of the fishing line 24. Pressure on the line 24 urges the line holder forwardly thereby tilting the trigger arm 28 and trigger 29, causing the trigger to become disengaged from the outer end of the lever 36. As a result the spring 25 having been under tension snaps the pole holder 12 upwardly, thereby sharply jerking the line 34 and setting the hook in the mouth of any fish which might have been disturbing any hook on the end of the line.

It is to be understood that this disclosure is by way of illustration and not limitation and that various other embodiments of the invention will become apparent to those skilled in the art without departing from the scope of the claims or spirit of the invention.

I claim:

1. A fish hook setter comprising a mounting bracket having a vertical portion and a laterally extending arm adjacent the upper end of the vertical portion, a pole holder having a pole receiving opening at its outer end pivotally mounted on said arm, a tension spring having one end secured to the pole holder and having the other end secured to the mounting bracket, a trigger arm pivotally mounted on the laterally extending arm of the mounting bracket, a line holder mounted on the trigger arm, a lever pivotally connected to the mounting bracket, a guide for said lever secured to the pole holder and a trigger mounted on the trigger arm consisting of a plate having spaced openings for receiving a portion of the lever when the pole holder is in a substantially horizontal position.

2. A fish hook setter as defined in claim 1 wherein the guide for the lever consists of an eye through which the lever extends.

3. A fish hook setter as defined in claim 1 wherein one of the openings in the trigger is in alignment with the guide for the lever.

4. A fish hook setter as defined in claim 1 wherein the line holder has means for frictionally engaging a fishing line passing through it.

5. A fish hook setter as defined in claim 1 wherein the pole holder is tubular in shape and has a resilient lining.

6. A fish hook setter as defined in claim 1 wherein the laterally extending arm of the mounting bracket is provided with a U-shaped bracket having upwardly extending arms between which the pole holder is pivotally mounted.

7. A fish hook setter as defined in claim 1 wherein one end of the tension spring is secured to the vertical portion of the mounting bracket.

8. A fish hook setter as defined in claim 1 wherein the movement of the pole holder to a substantially horizontal position increases the tension on the spring.

9. A fish hook setter as defined in claim 1 wherein the pole holder has an offset portion for engaging the mounting bracket when the pole holder is in a substantially vertical position.

* * * * *